US009387580B1

(12) United States Patent
Reitano

(10) Patent No.: US 9,387,580 B1
(45) Date of Patent: Jul. 12, 2016

(54) SELF-ADHESIVE WRAP FOR HANDLES AND METHOD OF USE

(76) Inventor: Ron Reitano, Davie, FL (US)

( * ) Notice: Subject to any disclaimer, the term of this patent is extended or adjusted under 35 U.S.C. 154(b) by 215 days.

(21) Appl. No.: 13/246,435

(22) Filed: Sep. 27, 2011

Related U.S. Application Data

(60) Provisional application No. 61/413,660, filed on Nov. 15, 2010.

(51) Int. Cl.
*B32B 9/00* (2006.01)
*B32B 33/00* (2006.01)
*B25G 1/10* (2006.01)

(52) U.S. Cl.
CPC ................. *B25G 1/102* (2013.01); *A63B 60/12* (2015.10); *A63B 60/14* (2015.10); *Y10T 428/14* (2015.01)

(58) Field of Classification Search
CPC .... B25G 1/102; Y10T 428/14; Y10T 428/28; Y10T 428/24273; Y10T 428/24314; Y10T 428/24298; Y10T 74/2087; A63B 49/08; A63B 60/12; A63B 60/14; A63B 60/18; A61F 13/02; A61F 13/0269
USPC .................. 428/40.1, 99, 105, 131, 134–136; 473/300–303, 549–551, 568; 442/394; 74/551.1, 551.6, 551.9; 16/110.1, 407, 16/421, 430
See application file for complete search history.

(56) References Cited

U.S. PATENT DOCUMENTS 775,662 A 11/1904 Lyon
1,008,604 A 11/1911 Lake
1,226,403 A 5/1917 Snyder
2,156,274 A 5/1939 Brown
2,274,605 A 2/1942 Hoffmeister
4,262,385 A 4/1981 Norman
4,823,433 A 4/1989 Curtis
5,193,246 A 3/1993 Huang
5,257,845 A 11/1993 McConnell
5,364,148 A 11/1994 Bartocci
5,380,576 A * 1/1995 Christensen ............. D04H 1/42 428/109
5,609,938 A * 3/1997 Shields ......................... 428/138
5,738,401 A 4/1998 Fan
5,884,955 A 3/1999 Pucillo
6,336,255 B1 1/2002 Gallup
6,352,169 B2 3/2002 Foster
6,405,409 B1 6/2002 Zirella
6,447,486 B1 * 9/2002 Tollini .................. A61M 25/02 604/180
6,497,006 B2 12/2002 Gallup
(Continued)

FOREIGN PATENT DOCUMENTS

GB 2069850 A * 9/1981 ............. A63B 49/08

*Primary Examiner* — Patricia L Nordmeyer
(74) *Attorney, Agent, or Firm* — H. John Rizvi; Gold & Rizvi, P.A.

(57) ABSTRACT

The present invention is related to a self-adhesive cushion laminar for use on handles such as those found on conventional buckets. The self-adhesive laminar includes a fabric layer having an adhesive surface and a non-stick sheet releasably covering the adhesive surface. The self-adhesive laminar is operable for being wrapped around a handle with the adhesive surface overlapping the fabric layer to provide a cushioned handle. The cushion laminar may also include a plurality of elongated cutouts forming a plurality of elongated strips where the cutouts and strips overlap each other to form grooves for receiving the fingers of a user's hand therein when holding onto a covered handle. The cushion laminar includes a variety of different geometrical shapes and sizes.

18 Claims, 4 Drawing Sheets

(56) References Cited

U.S. PATENT DOCUMENTS

| | | | | |
|---|---|---|---|---|
| 6,855,651 | B2 * | 2/2005 | Yu | 442/149 |
| 6,966,963 | B2 * | 11/2005 | O'Connor | 156/249 |
| 7,039,996 | B2 | 5/2006 | Crawley | |
| 7,305,738 | B2 | 12/2007 | Nawrocki | |
| 8,153,221 | B1 * | 4/2012 | MacKinnon | A41F 1/00 2/460 |
| 2007/0212520 | A1 * | 9/2007 | Furumori et al. | 428/134 |
| 2009/0104402 | A1 * | 4/2009 | Esaki | 428/136 |

* cited by examiner

SELF-ADHESIVE WRAP FOR HANDLES AND METHOD OF USE

CROSS-REFERENCE TO RELATED APPLICATION

This application claims the benefit of U.S. Provisional Patent Application Ser. No. 61/413,660 filed Nov. 15, 2010, which is incorporated herein in its entirety.

FIELD OF THE INVENTION

The present disclosure relates generally to handle grips or pads, and more particularly to a self-adhesive wrap configured to attach to a handle of a bucket for relieving pressure and fatigue to a user's hands and fingers and for absorbing shock when carrying a bucket filled with heavy material such as mortar, paint, dirt, rocks, etc. . . .

BACKGROUND OF THE INVENTION

A variety of containers such as buckets, whether prepackaged with a material or readily empty for use, often include a carrying handle that comprises a simple wire bail extending from one side of the bucket to the other. Opposite ends of the wire bail are typically bent at a right angle to provide a short segment that is securely retained within an aperture provided for on opposite sides of the bucket allowing the handle to pivot about a horizontal axis. The wire bail handle provides limited comfort when carrying a heavy bucket, especially for extended periods of time. The wire bail handle can be uncomfortable to hold, particularly when the bucket is loaded with heavy material such as mortar, rocks and dirt. Containers incorporating the use of wire bail handles can be found in local hardware or retail stores. For example, there are buckets sized and designed to hold paint, sealants, acrylic coating, tar pitch, dry cement, and other liquids or solids. The buckets come in a variety of different shapes, and are often sized to hold one to five gallons of a liquid material or sized to hold a certain amount of weight. Wire bail handles are inexpensive to fabricate, easy to assemble on buckets, and provide a quick and easy method for carrying or transporting a bucket.

In an effort to provide comfort to a person's hands and fingers when carrying a heavy bucket having a wire bail handle, industry has developed a small, plastic cylindrical tube that is generally located in a central holding region of the wire bail handle. The plastic tube typically includes a longitudinal opening extending along the center of the tube for the wire bail to extend through the opening. Because the wire bail is curved on opposite sides of the plastic tube, the cylindrical tube is prevented from sliding back and forth on the wire bail. Though the use of a plastic tube provides some improvement, it does not resolve the issue of having discomfort to the hands and fingers when carrying a heavy bucket. The plastic cylindrical tube is too rigid and creates pain, difficulty, and often leaves physical marks on a person's hands or fingers when carrying a heavy bucket. For example, when carrying a loaded bucket, the rigid tube compresses against the underside of the fingers displacing the skin and rubbing firmly on the bones of the fingers.

There have been several attempts to provide solutions to the problem stated above in the prior art. Other than completely replacing the prior art bucket handle, some of the most popular designs provide conventional prior art devices that include a cushion or pad-like material used for covering the handle. For example, in one conventional design, a number of inter-fitting pieces are installed on an already existing handle of a bucket to help enhance the conformability of the handle. The inter-fitting pieces may comprise hard rubber, soft plastic or foam-like elements that are secured together by fasteners such as screws or adhered together using glue or a strong, bonding adhesive. Another exemplary device provides an air cushion grip that is also fixed around an already existing handle. The cushion grip comprises an outer flat layer and a bottom layer provided with a plurality of air cells. The air cells are inflated or deflated, with the use of an air valve or pump, for adjusting the elasticity and shock-absorbing ability of the grip. Still another example of a conventional prior art device includes a pad or wrap configured for wrapping around or being attached to the outer surface of a handle. The pad generally comprises a square, laminate material having an open or closed-cell foam cushion and fasteners disposed along the outer surface of the laminate for securely wrapping pad around the handle. The fasteners often include snaps or straps. One drawback of such devices is that the layout of the fasteners results in either a pad rotating loosely around the handle because the pad cannot be attached firmly onto the handle, or that the underlying fasteners result in a bulky, lesser comfortable handle. Some prior art devices have also developed the use of non-slip surfaces or have include friction methods to prevent the pad from rotating around the handle. Still, other fasteners have been incorporated to ease the manner of wrapping a pad around a handle and to provide for a firm attachment. Such devices have incorporated the use of hooks and loops or Velcro™ fasteners that are disposed along the edges or central region of the pad to allow an easy and firm method of wrapping a cushion or pad around a handle. Though this conventional handle wrap or padding provides some level of comfort, it presents certain drawbacks. Over time, the hooks grab onto materials such as lint, dust, or other debris thereby reducing the bonding strength of the hook and loop from repeated use. Further, the loops can become extended and even break as a result of continued use.

As such, the above cited solutions provide little resolve to alleviating discomfort and pain to a user's hands when carrying a heavy bucket by the handle. What is desired is a handle wrap or padding that is easily retrofitted onto an existing handle, attaches securely to a handle without the need for fasteners, and more importantly includes shock absorbing characteristics, and relieves pressure to the hands and fingers of a user when carrying a bucket or other container loaded with heavy material such as mortar, paint, powder, dirt, rocks, etc. . . .

SUMMARY OF THE INVENTION

In one general aspect of the present invention there is provided, a handle wrap configured for attaching to the handle of a bucket or other container, the handle wrap comprising a reinforcing fabric layer, an adhesive layer joined to the reinforcing fabric layer, a release sheet detachably covering said adhesive layer, a plurality of elongated cutouts formed in the layers and sheet where each of the plurality of elongated cutouts begin from one edge of the wrap extend longitudinally a predetermined length where the plurality of elongated cutouts form a plurality of elongated strips, and where the plurality of elongated cutouts and the plurality of elongated strips are interspersed with each other along the width of the wrap. The reinforcing fabric layer comprises any of cotton, nylon, vinyl, denim, plastic, silk, linen, wool, worsted or any combination or blend thereof.

In another aspect of the invention, the handle wrap comprises any geometric shape including any of a square, a rectangular, an oval, an ellipse, a kite, a rhombus, a circle, or any other quadrilateral, parallelogram, or polygon shape. Further, the handle wrap may further include an elastomer layer that is interposed between the reinforcing fabric layer and the adhesive layer so that the reinforcing fabric layer, the elastomer layer, the adhesive layer, and the release sheet are joined together to form a flexible laminar. The elastomer layer may comprise any of rubber, neoprene, silicone, nitrite, silicon rubber, thermoplastic, open or closed-cell foam, any combination or blend thereof, or any other suitable material for providing a protective cushion.

In yet another aspect of the present invention there is provided, a method of forming a cushion on a handle, the method comprising the steps of providing a flexible laminar comprising a fabric layer having an upper surface and a bottom surface, an adhesive material disposed over the bottom surface of the fabric layer, a release sheet completely and detachably covering the adhesive layer, removing the release sheet from the adhesive material to expose the adhesive material when ready for attaching the flexible laminar to a handle, attaching one end of the flexible laminar so that the exposed adhesive material adheres to a longitudinal surface of the handle, and wrapping the flexible laminar around the handle where the adhesive material continuously overlaps with the fabric layer to form a cushion around the handle.

In still another aspect of the present invention, the method of forming a cushion on a handle includes a step of forming a plurality of elongated cutouts in the flexible laminar where each of the plurality of elongated cutouts beginning from an edge of the laminar and extend longitudinally a predetermined length where the plurality of elongated cutouts form a plurality of elongated strips, and where the plurality of elongated cutouts and the plurality of elongated strips are interspersed with each other along a width of the flexible laminar. A step of wrapping the flexible laminar over a handle includes the step of correspondingly aligning each of the plurality of elongated cutouts and each of the plurality of elongated strips so that the plurality of elongated cutouts and the plurality of elongated strips overlap each other to form a plurality of grooves extending a width of the handle.

In another aspect of the present invention, there is provided a self-adhesive laminar configured for use on a handle of a conventional bucket. The self-adhesive laminar comprises a fabric layer having an adhesive surface, a non-stick sheet releasably covering the adhesive layer, and wherein the self-adhesive laminar is operable for being wrapped around a handle where the adhesive surface overlaps the fabric layer to provide a cushioned handle.

These and other advantages of the invention will be further understood and appreciated by those skilled in the art by reference to the following written specifications, claims, and appended drawings.

BRIEF DESCRIPTION OF THE DRAWINGS

The invention will now be described, by way of example, with reference to the accompanying drawings, in which.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 7. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

It will be noted that for descriptive and illustrative purposes, the term "handle" as used herein refers to, but is not limited to, any object, member, structure, part, device, grip, holder, shaft, stem, or other structure that allows an individual to hold or grasp onto with the use of a human hand. Though the present invention is described as being used with handles, it will be also understood that the present invention may be implemented for use in a variety of different applications where an intended desire is to place a pad or cushion around an object, item or article, to provide a protective barrier to prevent injury or to increase the level of comfort during use.

Figure 1:
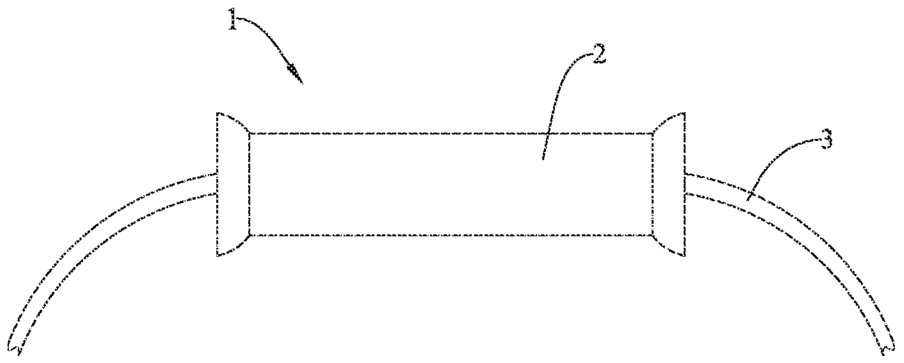
FIG. 1 Prior Art
FIG. 1 is a schematic view of a traditional plastic handle disposed on a wire bail typically used in connection with a bucket or other container, in accordance with the prior art.

Referring now to the drawings wherein like elements are represented by like numerals throughout, there is shown in FIG. 1, a schematic view of a handle system 1 including a traditional cylindrical plastic tube 2 rotatably disposed on a wire bail 3 configured for use on a conventional bucket or other container (not shown) in accordance with the prior art. Plastic tube 2 was implemented to alleviate the discomfort to hands and fingers often associated with carrying a heavy bucket by use of a wire bail 3. Conventionally, cylindrical tube 2 comprises a rigid, cylindrical plastic tube that provides limited relief of discomfort to a user's hand when carrying a heavy bucket. During use, the rigid design of the cylindrical tube 2 compresses against the inner surfaces of a user's fingers which results in compression indentations and pain to the skin and bones. To resolve this problem, a handle wrap 10 of the present invention is designed to wrap around the rigid, cylindrical tube 2 shown in the prior art, so as to provide a cushioned, comfortable handle for use with a conventional bucket.

Figure 2:
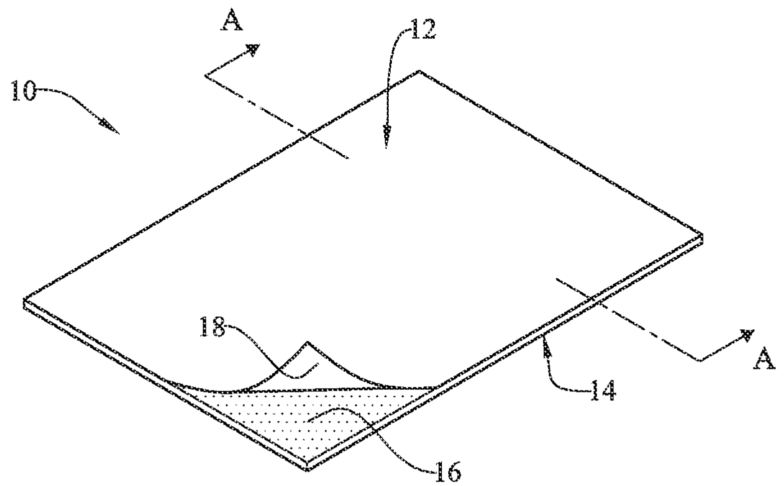
FIG. 2 is a perspective view of a handle wrap, according to one embodiment of the present invention.
Figure 2A:
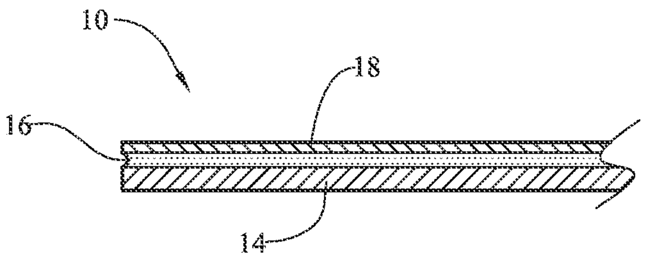
FIG. 2A is a partial cross-sectional view of the handle wrap of FIG. 2, as indicated at A-A.

There is shown in FIGS. 2 and 2A, a self-adhesive wrap 10 configured for use on a handle, according to one embodiment of the present invention. Handle wrap 10 comprises a generally rectangular or square, flexible laminar that includes a first laminae or layer 14 comprising a reinforcing, flexible fabric material 14, a second laminae or layer 16 comprising an adhesive material situated on one surface of layer 14, and a third laminae or layer 18 comprising a release sheet for releasably covering the adhesive material layer 16 to prevent exposure of the adhesive material when not in use. All three layers, 14, 16, 18 are joined together to form a planar laminar 10, as better illustrated in FIG. 2A as indicated at A-A of FIG. 2.

It will be noted that in one alternative embodiment, an elastomer material layer may be inserted between the first fabric layer 14, and the adhesive layer 16 to increase the thickness of the handle wrap 10. Examples of elastomer materials may include any of rubber, neoprene, silicone, nitrite, silicon rubber, thermoplastic elastomer, open or closed-cell foams, any combination or blend thereof, or any other material that can be used to provide a protective cushion. Various bonding techniques may be used for attaching the fabric layer 14 to an elastomer layer 16. For example, well known bonding techniques may include, but are not limited to, hot rolling, gluing, cement or adhesive, heat pressing, sewing, stitching, fabric welding, or any other suitable method. Thus, handle wrap 10 of the present invention may be constructed from a single layer, multiple layers, a singly ply, or a multi-ply.

The reinforcing fabric material may include any durable material such as, but not limited to, cotton, nylon, vinyl, denim, plastic, silk, linen, wool, worsted or any combination or blend thereof. Fabric layer 14 may also include non-slip features to enhance the frictional contact of the hand wrap 10 with a user's hand and fingers when carrying a heavy bucket. Examples of non-slip features may include friction bumps, ridges, indentations, dimples or the like that are integrally formed with or separately attached to layer 14. Further fabric layer 14 may include a waterproof or water resistant material or chemical to provide a dry handle wrap 10 when used in inclement weather. Release sheet 18 may comprise any of wax paper, non-stick paper, non-stick plastic sheet, or any other suitable material sheet used in adhesive peeling or release sheet applications where the sheet 18 is easily removed from the adhesive layer 16.

Figure 3:
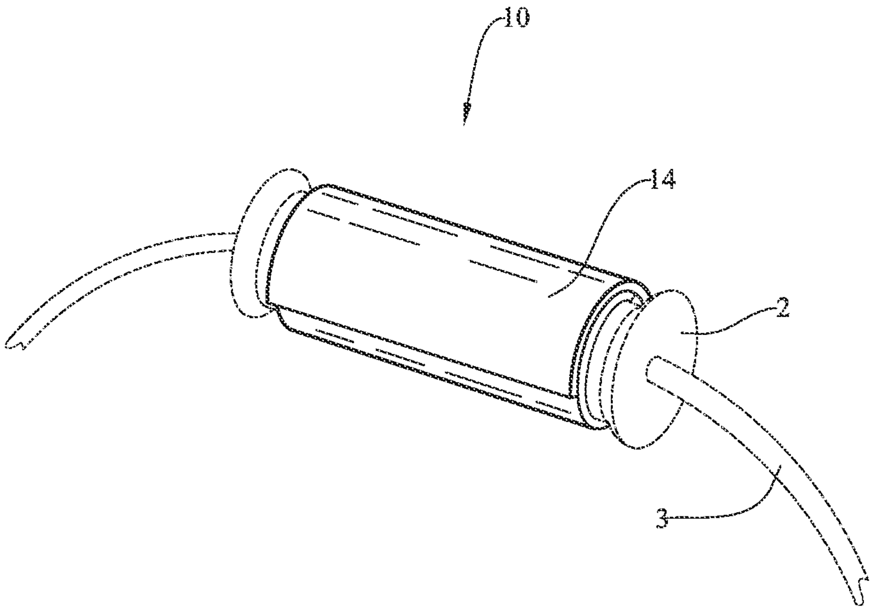
FIG. 3 is a perspective view of the handle wrap of FIG. 2, shown securely wrapped around the outer surface of a cylindrical tube handle, according to the one embodiment of the present invention.
Figure 4:
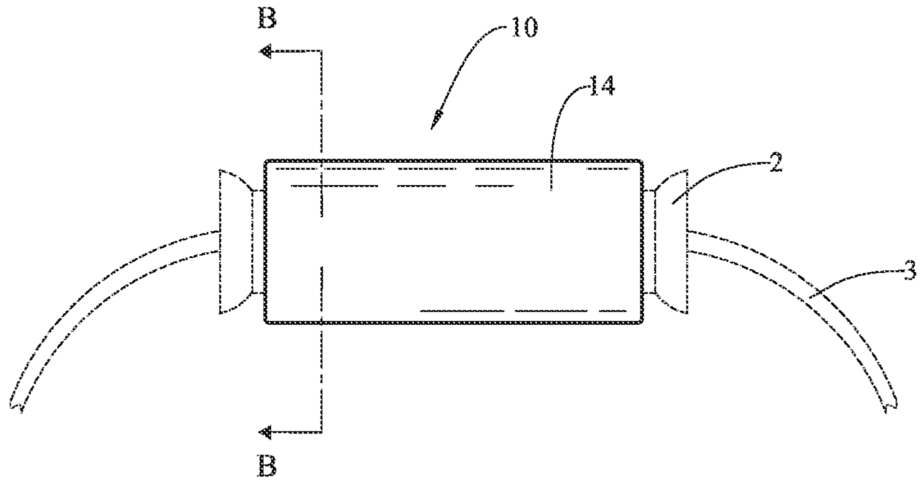
FIGS. 4 and 5 are front and side views, respectively, of the handle wrap of FIG. 2 shown securely wrapped around the outer surface of a cylindrical tube handle, according to the one embodiment of the present invention.

Turning now to FIGS. 3 and 4, there are shown a perspective view, and front view, respectively, of the handle wrap 10 of FIG. 2, shown securely wrapped around the outer surface of a handle 2, according to the one embodiment of the present invention. As seen, the already existing handle 2 may comprise a cylindrical tube having an elongated aperture for receiving a wire bail 3 where the wire bail 3 is configured for attachment to a bucket or container (not shown). To provide for a cushioned handle, a user simply removes all or a portion of release sheet 18 from the underside of the handle wrap 10, as illustrated in FIG. 2, to expose all or a portion of the adhesive layer 16. The handle wrap 10 is orientated such that the exposed adhesive end of the wrap 10 is attached to the longitudinal outer surface of cylindrical tube 2. With the release sheet 18 completely removed, the handle wrap 10 is continuously wrapped around the body of the cylindrical tube 2 resulting in layer 16 overlapping layer 14 over handle 2 thereby forming a cylindrical protective padding or cushion. The overlapping fabric layer 14 and adhesive layer 16 provide a soft, smooth surface for contact with a user's hand and fingers.

Figure 5:
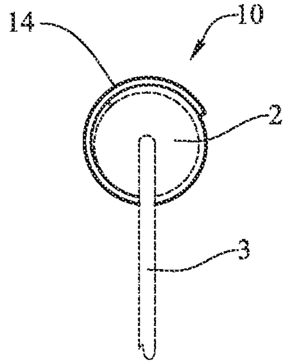
Figure 6:
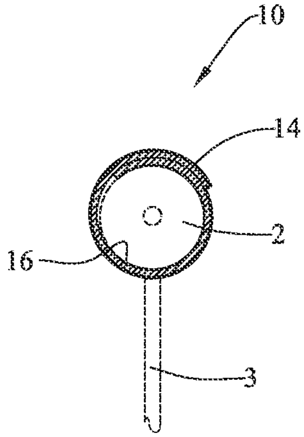
FIG. 6 is a cross-sectional view of FIG. 4, as indicated at B-B.

As reflected in FIGS. 5 and 6, laminar wrap 10 is wrapped around the cylindrical tube 2 to permit the adhesive material 16 to overlap and firmly stick to the reinforcing fabric layer 14 in a closed configuration. As such, the rigid, cylindrical handle 2 of the prior art is completely covered with a handle wrap 10 to help relieve the pressure, pain and fatigue of a user's hand and fingers and to provide shock absorbing padding to an already existing handle 2.

The dimensional length of the flexible laminar 10 and the diameter of the handle 2 both determine the extent of padding or cushion established. For example, a flexible handle wrap 10 dimensioned to have a longer length that is wrapped over a handle having a smaller diameter, will result in a handle 2 having multiple overlaps of layer 14 thus resulting in a handle 2 having more padding. The overlapping layers 14, 16 are better illustrated in FIG. 6, which is taken along a B-B line as indicated in FIG. 4. A flexible handle wrap 10 having a longer dimensional length used on a handle having a larger diameter, will result in a handle 2 having a lesser amount of overlap, thus providing a handle 2 having lesser amount of padding. A handle wrap 10 having a shorter dimensional length used on a handle 2 having a small diameter will also result in a handle having less padding overlapped on the handle 2.

Figure 7:
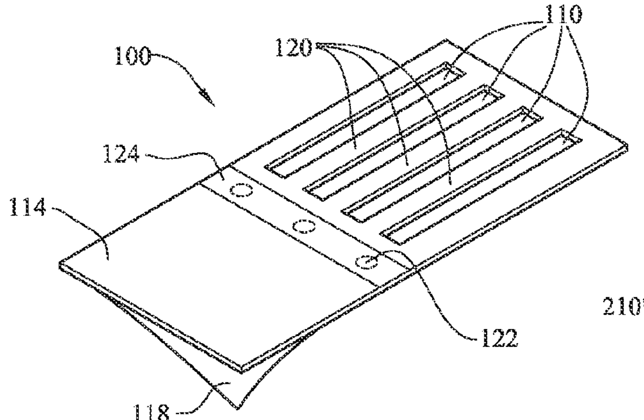
FIG. 7 is a perspective view of a rectangular handle wrap with a series of cutouts and strips, according to second embodiment of the present invention.

Turning now to FIG. 7, there is shown a perspective view of a handle wrap 100 according to a second embodiment of the present invention. Handle wrap 100 includes a generally rectangular laminar including a fabric layer 114 joined to an adhesive layer 16, and a release sheet 118 covering the adhesive layer 16. FIG. 7 illustrates the release sheet 118 shown partially removed from layer 116. Flexible laminar 100 further includes a series of longitudinal cutouts 110 beginning at one edge of the laminar 100 and extending the length of the laminar 100 a predetermined distance defining a series of longitudinal strips 120. As seen, the cutouts 110 are interspersed with the longitudinal strips 120 along the width of wrap 100. Each cutout 110 is in parallel with each other and with strips 120. The cutouts 110 and strips 120 are formed to provide gripping alignment of fingers when holding a handle of a bucket, as is better illustrated in FIGS. 9 and 10.

Flexible handle wrap 100 also includes a series of adhesive spots 122 selectively disposed along the width of the laminar 10 and covered with a spot release sheet 124. The spot release sheet 124 is used to prevent exposure of the adhesive spots 122. The release sheet 24 prevents the handle wrap 100 from sticking with each other during packaging or shipping, and restricts exposure of the adhesive spots 122 when the handle wrap 100 is not in use. Adhesive spots 122 are developed to firmly bind an overlapping end of laminar 100 when laminar 100 is fully wrapped around handle 2. Adhesive spots 122 may be strategically placed anywhere on the fabric layer 114 to provide a means of holding the wrapped handle 2 securely in place in a closed configuration over a handle. This feature is beneficial in that when the handle wrap 100 is fully wrapped around a handle 2, the ends of the laminar 100 firmly adhere to adhesive spots 122 thus preventing the ends of the handle wrap 100 from coming loose, fraying, or dislodging as a result of repeated use of the handle wrap 100.

Figure 8:
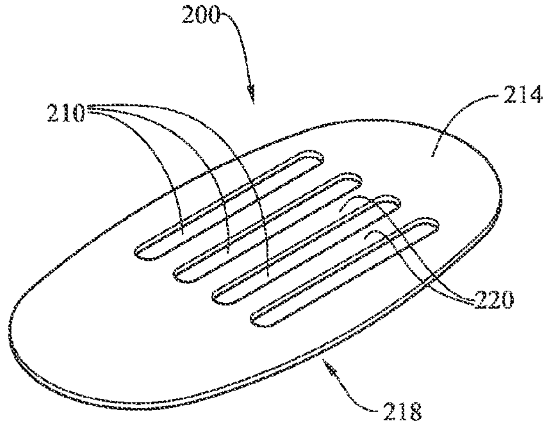
FIG. 8 is a perspective view of an oval handle wrap with a series of cutouts and strips, according to a third embodiment of the present invention.

FIG. 8 shows a perspective view of a handle wrap 200 according to a third embodiment of the present invention.

Handle wrap 200 is similar in construction to that of handle wrap 100 of FIG. 7, except for the geometric shape and non-inclusion of adhesive spots 122. Handle wrap 200 includes an oval laminar having a reinforcing fabric layer 214 including an adhesive layer 216, and a release sheet 218 covering the adhesive layer 216. Flexible laminar 200 further includes a series of longitudinal cutouts 210 formed within a central region of the laminar 200 and partially extending the length of the laminar 100 a predetermined distance defining a series of longitudinal strips 120. Cutouts 210 are interspersed with the longitudinal strips 220 along the width of wrap 200. As illustrated in FIG. 8, each cutout 210 is in parallel with each other and with strips 220.

Some non-limiting exemplary dimensions of a handle wrap 10, 100, 200 include a handle wrap having any geometrical shape including, but not limited to, any quadrilateral such as a square or rectangular, an oval shape, an ellipse shape, a rhombus, kite, or other parallelogram. The handle wrap 10, 100, 200 may be any from 4 to 10 inches long, and 2 to 12 inches wide. In one preferred embodiment, handle wrap 100 is 8 inches in length and 3½ inches in width. Cutouts 110, 210, may be ¼ inch wide and 3½ inches in length. As such, handle wrap 10, 100, 200 may include any length and width so as to accommodate handles 2 of varying widths or lengths.

Printed matter may be applied to the outer surface of release sheet 18, 118, 218 or outer surface of the fabric layer 14, 114, 214, for a user to see. For example, printed matter may include instructions on how to attach or align the handle wrap 10, 100, 200 onto a cylindrical handle 2, name of the product, advertising, company logo, contact information, origin of manufacture, indicia or markings, indications directing a user where to grasp and peel the release sheet 18, 118, 218, or any other information regarding the handle wrap 10 or related company or industry.

Figure 9:
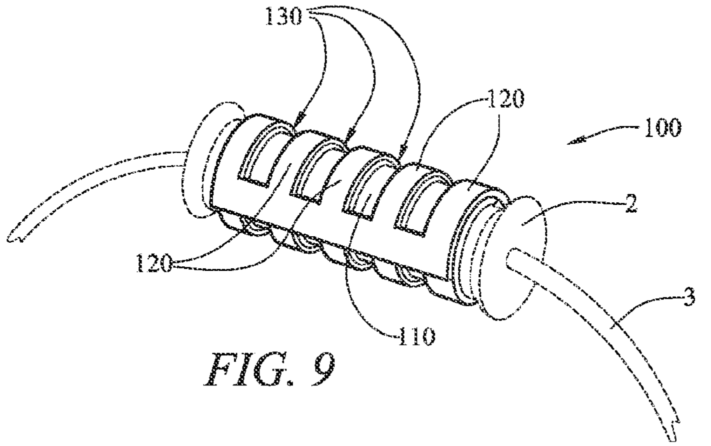
FIG. 9 is a perspective view of the handle wrap of FIG. 7, shown securely wrapped around a cylindrical tube handle configured for use on a conventional bucket.

FIG. 9 shows a perspective view of the handle wrap 100 of FIG. 7, shown securely wrapped around an existing handle generally used with a conventional bucket. The existing handle comprises a rigid, cylindrical tube 2 having an elongated aperture for receiving a wire bail 3 there through where distal ends of the wire bail 3 are attached to opposite sides of a container or bucket (not shown). In use, the handle wrap 100 is attached to the rigid tube 2 by simply removing release sheet 118 from the underside of the handle wrap 100, as illustrated in FIG. 7, to expose the adhesive material. An exposed adhesive end of handle wrap 100 is attached to the rigid cylindrical tube 2 by contacting the adhesive material to the longitudinal outer surface of the tube 2. Handle wrap 100 is continuously wrapped around the body of the tubular handle 2 resulting in layers 14 and 16 overlapping each other forming a cylindrical protective padding or cushion. Cutouts 110 and strips 120 correspondingly align with each other to form a series of grooves 130 that run parallel with each other along the width or length of the handle 2.

Figure 10:
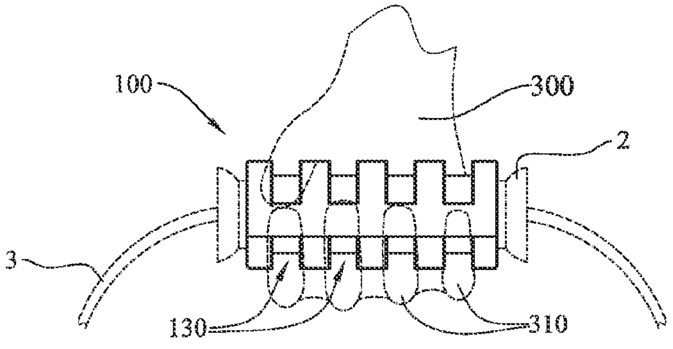
FIG. 10 is a front elevational view of the embodiment of FIG. 9, showing schematically, in broken lines, a hand grasping the covered handle with the fingers of a user interspersed with a series of parallel grooves.

The front elevational view of FIG. 10, shows schematically, in broken lines, a user grasping the padded handle of FIG. 9 with one hand 300 so that each individual finger 310 of the hand 300 rests in a corresponding groove 130. The fingers 310 of the person's hand 300 are interspersed with the grooves 130 created by the overlapping cutouts 110 and strips 120. The parallel grooves 130 offer an ergonometric alternative to a plainly designed handle wrap 10 of FIG. 2. The plural grooves 130 also provide frictional ridges that enhance the grasping and alignment of fingers when holding the padded handle.

The present invention provides a method for forming and retrofitting a cushioned protective covering over the outer surface of a conventional bucket handle where the method includes the steps of constructing a handle wrap or laminar to include a reinforcing fabric layer, a middle layer where the middle layer includes an adhesive material, and a release sheet for releasably covering the adhesive material. The method further includes the steps of removing the release sheet from the adhesive material, placing one end of the wrap with the exposed adhesive material onto the outer surface of a handle, and wrapping the handle wrap around the handle resulting in the fabric layer overlapping the middle layer to provide a closed cushion around a bucket handle.

The present invention provides various embodiments of handle wraps 10, 100, 200 that are easily retrofitted on existing bucket handles or other handles to provide a cushion or padded handle that provides comfort, relieves pressure, fatigue and pain, and provides shock absorbing properties for the hands and fingers of a user when carrying a bucket or other container loaded with heavy material.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What I claim is:

1. A self-adhesive laminar configured for use on a handle of a conventional bucket, said self-adhesive laminar comprising a fabric layer having an adhesive surface, a non-stick sheet releasably covering said adhesive surface, and wherein said self-adhesive laminar is operable for being wrapped around said handle with said adhesive surface overlapping said fabric layer to provide a cushion on said handle, wherein said self-adhesive laminar includes a plurality of elongated through cutouts formed in said layer and said sheet, said plurality of elongated through cutouts extending longitudinally along said layer and said release sheet a predetermined length, said plurality of elongated through cutouts forming a plurality of elongated strips, wherein said elongated through cutouts are arranged straight and parallel to each other, and wherein said strips are arranged in a spaced-apart configuration, and wherein said plurality of elongated through cutouts and said plurality of elongated strips are interspersed with each other along a width of said laminar, each elongated through cutout configured to provide a resting area for a respective finger when the handle wrap is wrapped around a handle.

2. The self-adhesive laminar of claim 1, wherein said fabric layer comprises any of cotton, nylon, vinyl, denim, plastic, silk, linen, wool, worsted or any combination or blend thereof, said self adhesive laminar comprising any geometrical shape.

3. The self-adhesive laminar of claim 2, further including an elastomer layer joined to said fabric layer and having said adhesive releasably covered by said non-stick sheet, said elastomer layer comprising any of rubber, neoprene, silicone, nitrite, silicon rubber, thermoplastic, open or closed-cell foam, any combination or blend thereof.

4. A handle wrap configured for attaching to the handle of a bucket or other container, said handle wrap comprising:

a reinforcing fabric layer;

an adhesive layer joined to said reinforcing fabric layer;

a release sheet detachably covering said adhesive layer;

a plurality of elongated through cutouts formed in said layers and in said sheet, said plurality of elongated through cutouts beginning from an edge of said layers and said release sheet and extending longitudinally a predetermined length, said plurality of elongated through cutouts forming a plurality of elongated strips; wherein when said handle wrap adopts a flat configuration, said elongated through cutouts are arranged straight and parallel to each other, and said elongated strips are arranged in a spaced-apart configuration; and wherein said plurality of elongated through cutouts and said plurality of elongated strips are interspersed with each other along a width of said wrap, each elongated through cutout configured to provide a resting area for a respective finger when the handle wrap is wrapped around a handle.

5. The handle wrap of claim 4, wherein said reinforcing fabric layer comprises any of cotton, nylon, vinyl, denim, plastic, silk, linen, wool, worsted or any combination or blend thereof.

6. The handle wrap of claim 5, wherein said layers and said release sheet correspondingly comprise any geometric shape including any of a square, a rectangular, an oval, an ellipse, a kite, a rhombus, a circle, or any other quadrilateral, parallelogram, or polygon shape.

7. The handle wrap of claim 6, further including adhesive drops disposed on an outer surface area of said reinforcing fabric layer and near terminating ends of said plurality of elongated through cutouts.

8. The handle wrap of claim 7, further include a drop release sheet removably disposed over said adhesive drops.

9. The handle wrap of claim 8, further including an elastomer layer interposed between said reinforcing fabric layer and said adhesive layer, said reinforcing fabric layer, said elastomer layer, said adhesive layer, and said release sheet joined to form a flexible laminar.

10. The handle wrap of claim 9, wherein said elastomer layer comprises an elastomer material including any of rubber, neoprene, silicone, nitrite, silicon rubber, thermoplastic, open or closed-cell foam, any combination or blend thereof.

11. The handle wrap of claim 4, further including markings or indicia printed on an exposed surface of said release sheet, said markings or indicia including any of instructions on how to use said handle wrap, company logos, advertising, contact information, origin of manufacture, lot data, or any other information relating to said handle wrap or handle wrap fabricating industry or company.

12. A method of forming a cushion on a handle, said method comprising the steps of:

providing a flexible laminar comprising:

a fabric layer having an upper surface and a bottom surface;

an adhesive material disposed over said bottom surface of said fabric layer;

a release sheet completely and detachably covering said adhesive layer;

a plurality of elongated through cutouts formed in said layer and said sheet, said plurality of elongated through cutouts extending longitudinally along said layer and said release sheet a predetermined length, said plurality of elongated through cutouts forming a plurality of elongated strips, wherein when said flexible laminar adopts a flat configuration said elongated through cutouts are arranged straight and parallel to each other and said strips are arranged in a spaced-apart configuration, and wherein said plurality of elongated through cutouts and said plurality of elongated strips are interspersed with each other along a width of said laminar, each elongated through cutout configured to provide a resting area for a respective finger when the handle wrap is wrapped around a handle;

removing said release sheet from said adhesive material to expose said adhesive material when ready for attaching said flexible laminar to said handle;

attaching one end of said flexible laminar so that said exposed adhesive material adheres to a longitudinal surface of said handle; and wrapping said flexible laminar around said handle where said adhesive material continuously overlaps said fabric layer to form a cushion around said handle, and to cause each elongated through cutout to overlap and each strip to overlap, thereby forming a plurality of grooves extending along the width of the handle.

13. The method of claim 12, wherein said step of providing includes using a fabric layer that comprises any of cotton, nylon, vinyl, denim, plastic, silk, linen, wool, worsted or any combination or blend thereof.

14. The method of claim 13, wherein said flexible laminar comprises any geometric shape including any of a square, a rectangular, an oval, an ellipse, a kite, a rhombus, a circle, or any other quadrilateral, parallelogram, or polygon shape.

15. The method of claim 12, wherein said step of providing includes a step of disposing adhesive drops on said upper surface of said fabric layer near said plurality of elongated through cutouts, and said plurality of elongated strips, and covering said adhesive drops with a detachable drop release sheet.

16. The method of claim 15, wherein said step of removing said release sheet includes a step of removing said drop release sheet from said adhesive drops, and wherein said step of wrapping said flexible laminar over said handle includes the step of correspondingly aligning each of said plurality of elongated through cutouts and each of said plurality of elongated strips so that said plurality of elongated through cutouts and each of said plurality of elongated strips overlap each other to form a plurality of grooves extending a width of said handle.

17. The method of claim 16, further including the step of attaching one end of said flexible laminar to said adhesive drops to prevent said one end of said laminar from becoming loose or dislodging as a result of repeatedly grasping said flexible laminar on said handle.

18. The method of claim 15, wherein the step of providing further includes the step of interposing an elastomer layer between said fabric layer and said adhesive material, said elastomer layer comprising any of rubber, neoprene, silicone, nitrite, silicon rubber, thermoplastic, open or closed-cell foam, any combination or blend thereof, or any other suitable material for providing a protective cushion.

* * * * *